United States Patent [19]

Sugiyama et al.

[11] Patent Number: 4,550,393

[45] Date of Patent: Oct. 29, 1985

[54] SYSTEM FOR REPRODUCING AN ADDRESS SIGNAL FROM EACH TRACK TURN DURING A SEARCH MODE OPERATION OF A REPRODUCING APPARATUS

[75] Inventors: Hiroyuki Sugiyama, Isehara; Masaki Sakurai; Ryozo Abe, both of, Yokohama; Kenji Yoshihara, Chiba all of Japan

[73] Assignee: Victor Company of Japan, Ltd., Yokohama, Japan

[21] Appl. No.: 376,970

[22] Filed: May 11, 1982

[30] Foreign Application Priority Data

May 18, 1981 [JP] Japan .................................. 56-74619

[51] Int. Cl.$^4$ ......................... G11B 17/22; H04N 5/76
[52] U.S. Cl. ........................................ 369/32; 369/33; 369/43; 358/342; 360/72.2; 360/48
[58] Field of Search ................. 358/342, 335; 360/18, 360/27, 48, 72.2, 72.1; 369/32, 33, 43–44, 46–49, 53, 54, 59

[56] References Cited

U.S. PATENT DOCUMENTS

| | | | |
|---|---|---|---|
| 4,142,209 | 2/1979 | Hedlund et al. ..................... | 358/342 |
| 4,315,283 | 2/1982 | Kinjo et al. ........................ | 369/44 X |
| 4,321,635 | 3/1982 | Tsuyuguchi ....................... | 369/32 X |
| 4,330,879 | 5/1982 | Wine ............................... | 369/126 X |
| 4,428,002 | 1/1984 | Hirata ............................. | 358/907 X |

FOREIGN PATENT DOCUMENTS 2841381 3/1980 United Kingdom .
2409572 6/1979 France .
2055503 3/1981 United Kingdom .
2082823 3/1982 United Kingdom .

Primary Examiner—Aristotelis M. Psitos
Attorney, Agent, or Firm—Louis Bernat

[57] ABSTRACT

An address signal reproducing system is provided in a rotary recording medium reproducing apparatus which reproduces signals from a rotary recording medium by a reproducing element, where the rotary recording medium is recorded with an address signal in units of predetermined sections for a plurality of sections for each track turn of the rotary recording medium. The address signal reproducing system comprises a kick pulse signal generator for generating a kick pulse signal for forcibly shifting the reproducing element to an adjacent track, a shifting circuit for performing tracking control with respect to the reproducing element and shifting the reproducing element to an adjacent track when applied with the kick pulse signal generated by the kick pulse signal generator, and a stopping circuit for stopping the kick pulse signal from being generated by the kick pulse signal generator during an interval in which the reproducing element traces over at least one of the predetermined sections of the rotary recording medium. The reproducing element reproduces the address signal under a tracking controlled state without being shifted, during the interval in which the generation of the kick pulse signal is stopped by the stopping circuit.

2 Claims, 6 Drawing Figures

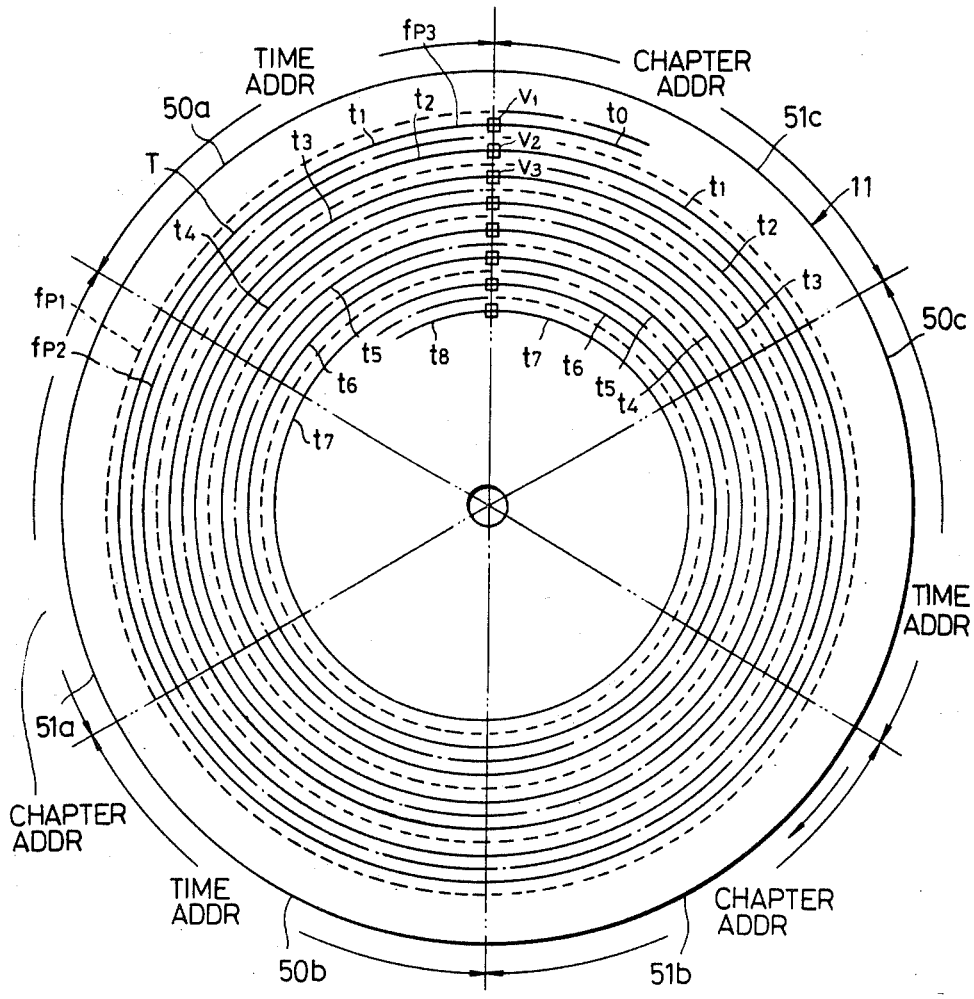
FIG. 3
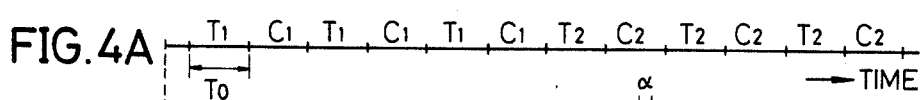
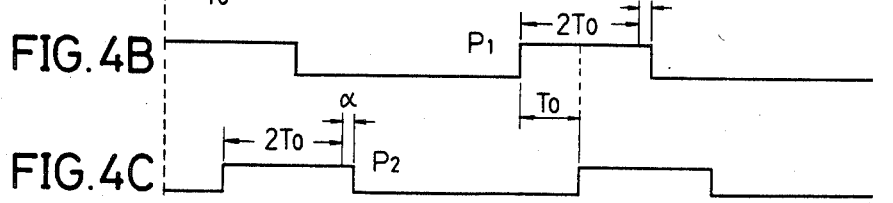

SYSTEM FOR REPRODUCING AN ADDRESS SIGNAL FROM EACH TRACK TURN DURING A SEARCH MODE OPERATION OF A REPRODUCING APPARATUS

BACKGROUND OF THE INVENTION

The present invention generally relates to address signal reproducing systems in rotary recording medium reproducing apparatuses, and more particularly to a system capable of reproducing an address signal even during a random access operation or a high-speed search operation in which a reproducing element is forcibly shifted over tracks in the rotary recording medium reproducing apparatus.

A new information signal recording and/or reproducing system has been proposed in U.S. Pat. Nos. 4,315,283 and 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged since the recording track has no groove. The reproducing stylus can trace the same portion of the track repeatedly many times, whereby a special reproduction such as still, slow-motion, or quick-motion reproduction becomes possible. Moreover, operations such as a random access, high-speed search, and automatic cueing operation in which the reproducing stylus is shifted to a position of a desired recorded program where the reproduction is to be started, can be performed with ease.

In order to perform operations such as the above random access, high-speed search, and automatic cueing operations, signals such as an address signal (hereinafter referred to as a chapter address signal) for indicating the number of the recorded program, and an address signal (hereinafter referred to as a time address signal) for indicating the position within the recorded program in reproducing time from the start of that recorded program or in reproducing time from the start of the first program recorded on the disc, are recorded onto the disc.

The above program information signal recorded onto the disc may be an audio signal, and the disc may be a digital audio disc onto which a PCM signal obtained by pulse-code-modulating the audio signal is recorded. For example, the PCM signal having a sampling frequency of 47.25 kHz is recorded in a time series manner in terms of blocks, wherein one block comprises one hundred and several tens of bits. The address signal is recorded in a time series manner in one bit at the last part of each block, to transmit all the one hundred and several tens of bits of the address signal by one hundred and several tens of blocks. This address signal having one hundred and several tens of bits is recorded twenty and some odd times for one revolution of the disc, and the content of the address signal is the same for the same track turn.

Conventionally, when performing operations such as the above random access, high-speed search, and automatic cueing operations with respect to a disc recorded with such an address signal, the address of the position where the reproducing stylus is reproducing and a desired address which has been set are compared. According to the difference between the two addresses, the reproducing stylus is moved at a high speed in a radial direction of the disc. If the address of the position of the reproducing stylus and the set address still differ after the reproducing stylus is moved, the reproducing stylus is again moved at a high speed in a similar manner so that the two addresses coincide.

However, in the conventional system, tracking control is not performed with respect to the reproducing stylus during the interval in which the reproducing stylus is moved at a high speed. Accordingly, not all the bits of the address signal can be reproduced during this interval, because the address signal is recorded in a scattered manner for each track turn. Thus, in the conventional system, there was a disadvantage in that the position of the reproducing stylus cannot be indicated by the chapter or the time during the above described operation. In addition, since the address signal is not reproduced during the interval in which the reproducing stylus is moved at a high speed, there was a disadvantage in that the reproducing stylus does not always and immediately reach the desired set address position by one high-speed moving operation.

SUMMARY OF THE INVENTION

Accordingly, it is a general object of the present invention to provide a novel and useful address signal reproducing system in a rotary recording medium reproducing apparatus, in which the above described disadvantages have been overcome.

Another and more specific object of the present invention is to provide an address signal reproducing system in a rotary recording medium reproducing apparatus, capable of positively reproducing a recorded address signal in each track on a rotary recording medium, during an interval in which a reproducing element is moved to a desired set address position at a relatively high speed. According to the system of the present invention, the address such as the chapter and time corresponding to the position of the reproducing element can be indicated constantly, because the address signal is reproduced even when the reproducing stylus is moved at a high speed. Moreover, constant comparison between the present address (address of the position of the reproducing element) and the desired set address is performed, to immediately and smoothly move the reproducing element to the desired set address position.

Still another object of the present invention is to provide an address signal reproducing system in a rotary recording medium reproducing apparatus, in which a reproducing element traces a part of the track in each track turn under a tracking controlled state and the reproducing element is forcibly shifted at the other part of the track in each track turn, and the address signal is reproduced during the interval in which the above reproducing element traces a part of the track under the tracking controlled state, so that the reproducing element can be moved at a relatively high speed to a desired address position and the address signal can be reproduced.

Other objects and further features of the present invention will be apparent from the following detailed description when read in conjunction with the accompanying drawings.

BRIEF DESCRIPTION OF THE DRAWINGS

FIG. 3 shows a track pattern and a recording range of an address signal on a rotary recording medium; and FIGS. 4A, 4B, and 4C are graphs respectively showing a reproducing order of a reproduced address signal, and a waveform of a gate signal for gating and obtaining the reproduced address signal.

DETAILED DESCRIPTION

Figure 1:
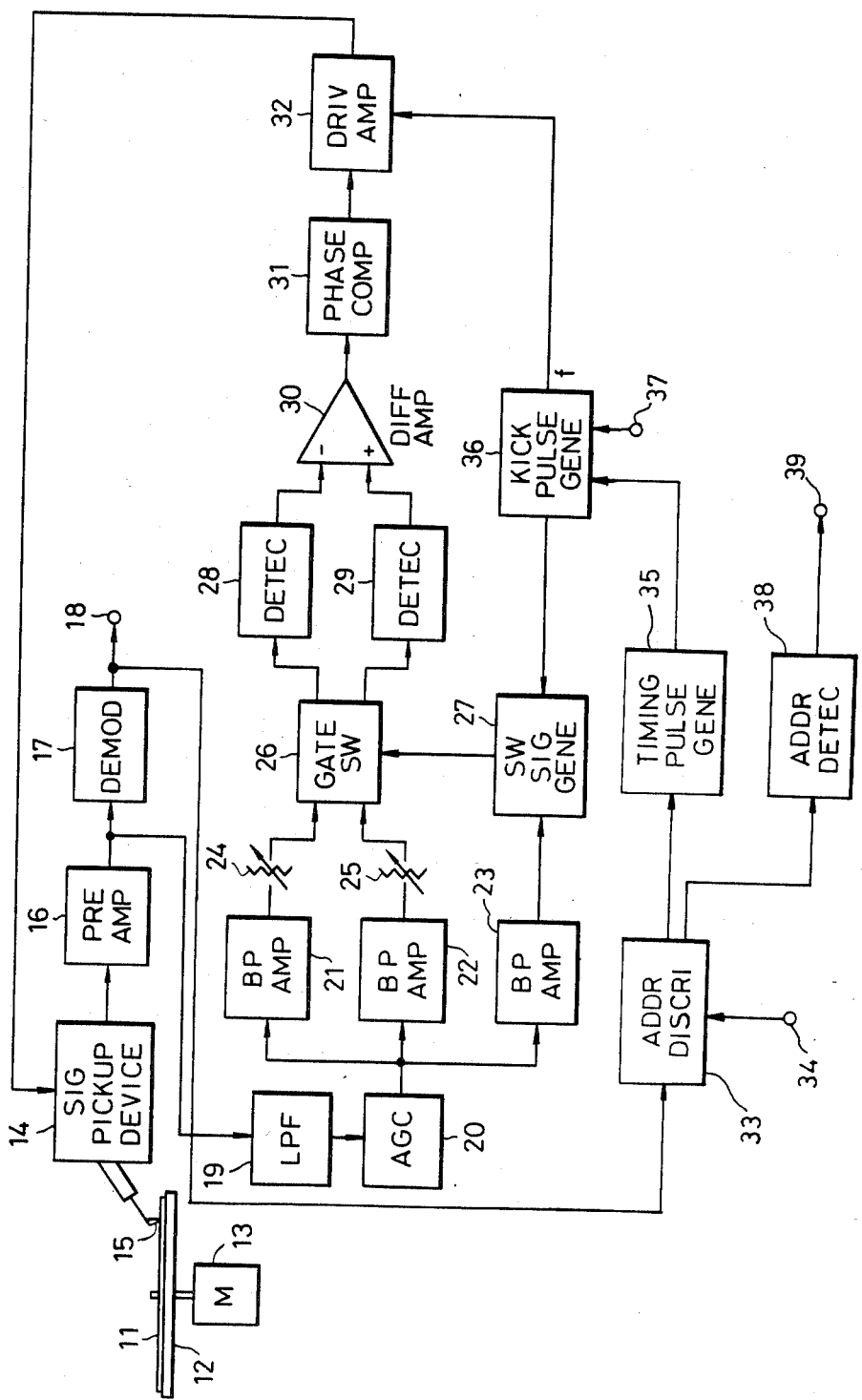
FIG. 1 is a systematic block diagram showing a rotary recording medium reproducing apparatus applied with an embodiment of an address signal reproducing system according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part of the disc 11 at a speed equal to the distance of one track pitch for one revolution of the turntable 12, during a forward normal reproduction mode. Accordingly, the reproducing stylus 15 of the signal pickup device 14 travels radially across the rotating disc 11 and relatively traces over the spiral track of the disc 11.

Figure 2:
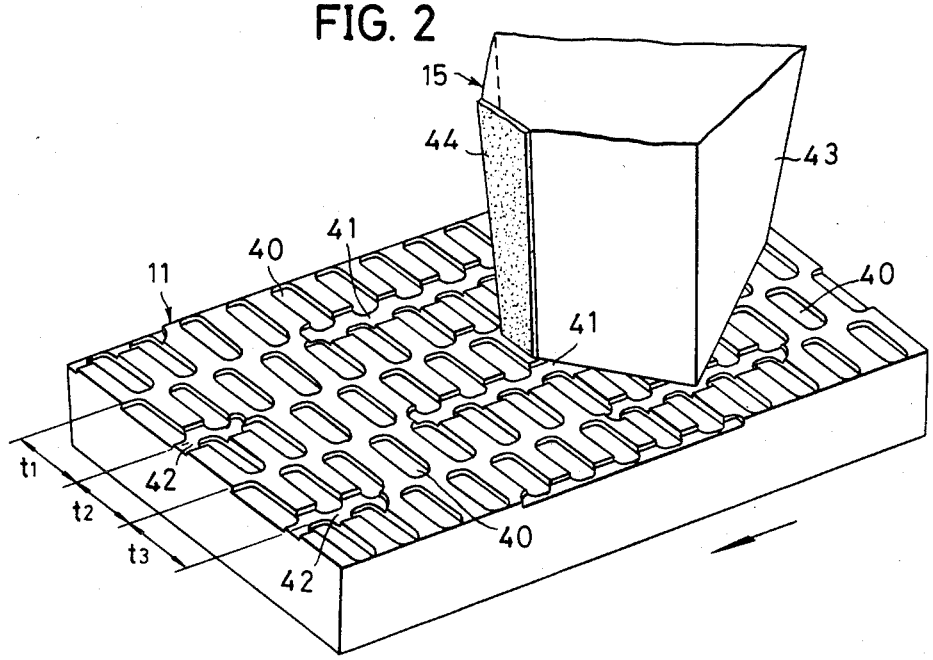
FIG. 2 is a perspective view, in an enlarged scale, showing a part of a rotary recording medium together with a tip end part of a reproducing stylus.

A program signal is recorded on a spiral track with pits formed on the disc 11 according to the information contents of the program signal. One part of this track is shown in an enlarged scale in FIG. 2. In FIG. 2, track turns of a single continuous spiral track, corresponding to each revolution of the disc 11, are designated by t1, t2, t3, .... Each track turn is constituted by the formation of pits 40 of a program information signal along a plane track path and has no stylus guide groove formed therein. With respect to one track turn t1, pits 41 of a first reference signal fp1 are formed on one lateral side of the track as viewed in the track path direction. Pits 42 of a second reference signal fp2 are formed on the other side of the track.

In an intermediate position between the centerlines of adjacent track turns, only pits of either one kind of the pits 41 and 42 of the above reference signals fp1 and fp2 are formed, and moreover, with respect to one track, the sides on which the pits 41 and 42 are formed are alternated for every track turn. That is, if the pits 41 and 42 are respectively formed on the right and left sides of one track turn, for example, the pits 42 and 41 will respectively be formed on the right and left sides of each of the adjacent track turns.

The tip end of the reproducing stylus 15 has a shape shown in FIG. 2. The reproducing stylus 15 is constituted by a stylus structure 43 having a disc tracing surface which has a width greater than a track width, and an electrode 44 fixed to the rear face of the stylus structure 43. As the reproducing stylus 15 traces over a track on the disc 11 rotating in a direction indicated by an arrow, the program information signal recorded thereon by the formation of pits is reproduced as variations in the electrostatic capacitance between the surface of the disc 11 and the electrode 44 of the reproducing stylus 15.

On the disc 11, as indicated in FIG. 3, a program information signal is recorded along a spiral track T. In FIG. 3, the tracks of the reference signal fp1 is shown by dotted lines, while the reference signal fp2 is shown by one-dot chain lines. The successive track parts corresponding to one revolution of the disc of a single spiral track T are respectively designated by track turns t1, t2, t3, .... Furthermore, a third reference signal fp3 is recorded at the starting end positions V1, V2, V3, ... of each of the track turns t1, t2, t3, ..., that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the rosonant circuit varies in response to this variation in the electrostatic capacitance, and is formed into a signal of a desired level. The resulting output of the preamplifier 16, is demodulated into the original signal by a demodulator 17 and is obtained as an output through an output terminal 18. When the program information signal recorded on the disc 11 is a signal obtained by subjecting an audio signal through modified frequency modulation (MFM) and then frequency-modulating this MFM audio signal, for example, the demodulator 17 is constructed to frequency-demodulate the supplied signal and then subject this frequency-demodulated signal to MFM demodulation so as to obtain the original audio signal.

The output signal of the preamplifier 16 is supplied to a lowpass filter 19 wherein the reference signals fp1, fp2, and fp3 are separated. The separated reference signals pass through an automatic gain control circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequencies fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26. The reference signal fp3 which is separated and amplified at the above bandpass amplifier 23, is supplied to a switching signal generating circuit 27.

The gate switching circuit 26 performs switching of the reference signals fp1 and fp2 every one revolution period of the disc 11 upon normal reproduction, in response to the switching signal generated by the switching signal generating circuit 27 which is applied thereto. Hence, due to the switching signal which reverses polarity every 1/15 seconds, the signals fp1 and fp2 are always alternately supplied to detecting circuits 28 and 29 from the gate switching circuit 26.

The detecting circuits 28 and 29 detect the envelopes of their respective input reference signals and convert the input reference signals into DC voltages. These DC voltages are then supplied to a differential amplifier 30.

The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal passes through a phase compensation circuit 31 and is further amplified to a specific level by a driving amplifier 32.

The output signal of the driving amplifier 32 is applied to a coil of the signal pickup device 14 as a control signal, to control the signal pickup device 14. As a result, tracking control is performed with respect to the reproducing stylus 15 so that the above tracking error signal becomes zero, that is, so that the reproducing stylus 15 correctly traces over the track T on the disc 11.

In order to simplify the explanation, it will be assumed that the address signal comprises the above time address signal and the chapter address signal, and that the same address signal is recorded three times for one revolution of the disc. In this case, an address signal section on the disc 11 can be divided into parts 50a, 50b, and 50c wherein the time address signal is recorded and parts 51a, 51b, and 51c wherein the chapter address signal is recorded, as shown in FIG. 3. Accordingly, when normal reproduction is performed with respect to the disc 11, a time address signal T1 is reproduced for an interval corresponding to 1/6 revolution of the disc, and a chapter address signal C1 is reproduced for an interval corresponding to the succeeding 1/6 revolution of the disc. Thereafter, the time address signal T1 and the chapter address signal C1 are alternately reproduced twice, respectively. A time address signal T2 and a chapter address signal C2 are similarly and alternately reproduced three times, respectively, for the next track turn. The time address signals and chapter address signals are similarly reproduced for other succeeding track turns.

In FIG. 1, the signal demodulated at the demodulator 17 is obtained through the output terminal 18 as described above, and also supplied to an address discriminator 33. A specifying signal corresponding to the kind of address the operator wishes to search, is supplied to the address discriminator 33 through a terminal 34. This specifying signal determines whether the desired address is a time address or a chapter address, that is, the specifying signal specifies the kind of desired address which is to be indicated. The address discriminator 33 collects the address bits existing at the last part of each block of the above program information signal, to reconstruct the address signal. When the kind of address signal specified by the specifying signal obtained through the terminal 34 and the kind of address signal presently being obtained through the reproducing stylus differ, the address discriminator 33 supplies a switching signal to a timing pulse generator 35.

If the reproducing interval in which each of the address signals T1, C1, T2, C2, . . . are reproduced is designated by To, the timing pulse generator 35 generates a timing pulse P1 or P2 of a duration $(2To+\alpha)$ as shown in FIGS. 4B or 4C. The timing pulses P1 and P2 shown in FIGS. 4B and 4C have phases mutually shifted by the interval To. The timing pulse generator 35 generates the timing pulse P1 or P2 shown in FIGS. 4B or 4C, according to the switching signal obtained from the address discriminator 33. The value of $\alpha$ in the above duration $(2T+\alpha)$ is set to $0 \leq \alpha < To$, and this interval $\alpha$ is an interval determined according to the jitter in the reproduced signal. The interval $\alpha$ is provided as a surplus interval so that the address signal is positively obtained even when jitter exists.

The output timing pulse P1 or P2 of the timing pulse generator 35 is supplied to a kick pulse generator 36. This kick pulse generator 36 generates a series of kick pulses when applied with a signal corresponding to an operational mode such as a random access, automatic search, and automatic cueing mode. However, the kick pulse generator 36 stops the generation of the kick pulses when the timing pulses P1 or P2 applied thereto from the timing pulse generator 35 is of high level.

The series of kick pulses generated by the kick pulse generator 36 is applied to the tracking coil in the signal pickup device 14, through the driving amplifier 32. Hence, the reproducing stylus 15 is shifted to an adjacent track every time the kick pulse is applied to the above tracking coil. For example, when the timing pulse P1 is applied to the kick pulse generator 36, the kick pulse is not generated during the high-level period of the timing pulse P1, and the reproducing stylus 15 traces over one track in a tracking controlled state without being shifted to an adjacent track during this high-level period. In the present embodiment of the invention, the period is such that the high-level period $(2To+\alpha)$ of the timing pulses P1 and P2 exists at a rate of once for every one revolution of the disc 11. Accordingly, for every track turn of the disc 11, the reproducing stylus 15 is only shifted during the interval $(2To+\alpha)$ shown in FIG. 4B, and the reproducing stylus 15 is shifted and advances towards the inner peripheral direction of the disc 11 for the other intervals. The shifting of the reproducing stylus 15 by the kick pulse is performed at a rate of 1000 times per second, for example. The period of the above interval in which the timing pulses P1 and P2 are of high level is not limited to the above, and may be a rate such that the high-level period occurs a plurality of times for one revolution of the disc 11. Further, the high-level period may occur once for a plurality of revolutions of the disc 11.

Accordingly, when the timing pulse P1 is applied to the kick pulse generator 36, a part of the address signal C1, the entire address signal T2, and a part of the address signal C2 are reproduced, because the reproducing stylus 15 is not shifted during the high-level period of the timing pulse P1, as clearly understood from FIGS. 4A and 4B. Hence, the time address signal T2 is reproduced in a complete form. The reproducing stylus 15 is continuously shifted during the low-level period of the timing pulse P1, but during the succeeding high-level period of the timing pulse P1, the time address of the position where the reproducing stylus 15 is located is similarly reproduced. Thus, when the reproducing stylus 15 is continuously shifted and advances towards the inner periphery of the disc 11 at a high speed, the time address at one part among the time address signal recorded parts 50a, 50b, and 50c is reproduced for one revolution of the disc 11. The set time address position and the time address at the position where the reproducing stylus 15 is located can be compared at a rate of once for one revolution of the disc 11. Therefore, the reproducing stylus 15 can be transferred to this set address position with a relatively high speed, and during this operation, the present location (position) of the reproducing stylus 15 can be indicated.

The output signal of the address discriminator 33 is supplied to an address signal detector 38 wherein the above time address signal or the chapter address signal is detected in a complete form. The address signal thus detected is obtained through an output terminal 39. This address signal hence obtained is used to indicate the present position of the reproducing stylus, and also used for comparison with the set address.

Similarly, when the set target address position is a position described by the chapter address and the timing pulse P2 is accordingly supplied to the timing pulse generator 35 from the kick pulse generator 36, the chapter address signal C1 is reproduced in a complete form as clearly understood from FIGS. 4A and 4C.

Since the duration of the timing pulses P1 and P2 are set to $(2T_o + \alpha)$, it is not essential for the phases of the output switching signal of the address discriminator 33 and the output timing pulse of the timing pulse generator 35 to be in synchronism with each other in order to positively obtain the time address signal or the chapter address signal.

In the above described embodiment of the invention, three pairs of sections (a total of six sections) of the time address signal and the chapter address signal exist for one revolution of the disc 11, as shown in FIG. 3. However, in practical use, twenty pairs of sections of the time address signal and the chapter address signal are provided for one revolution of the disc 11, for example.

Further, the present invention is not limited to these embodiments, but various variations and modifications may be made without departing from the scope of the present invention.

What is claimed is:

1. An address signal reproducing system in a reproducing apparatus which comprises a reproducing element for reproducing elements from a rotary recording medium, said rotary recording medium having an address signal together with a program information signal recorded on track turns, said address signal comprising a time address signal which indicates the recorded position in terms of reproducing time and a chapter address signal which indicates the program number of the program information signal, each of said track turns being divided into n sections, where n is an even number greater than two, said time address signal and said chapter address signal being alternately recorded in the n sections of each track turn for a length of each of the n sections, said reproducing element traversing a plurality of track turns during a search mode of said reproducing apparatus in a manner such that said reproducing element scans only a portion of each of said plurality of track turns, said address signal reproducing system comprising:

kick pulse signal generating means for generating a kick pulse signal;

shifting means for performing tracking control with respect to said reproducing element and for shifting said reproducing element from one track turn to another track turn responsive to the kick pulse signal from said kick pulse signal generating means;

terminal means for receiving an external specifying signal which indicates the kind of address signal to be used;

switching signal generating means for generating a switching signal in response to a difference between the kind of address indicated by said external specifying signal and the kind of address presently being reproduced; and timing signal generating means for selectively generating a first or second timing signal responsive to the switching signal from said switching signal generating means and for supplying the first or second timing signal to said kick pulse signal generating means, said first and second timing signals having a phase difference of $T_o$, each of said first and second timing signals comprising a pulse having a duration, said kick pulse signal generating means stopping the generation of the kick pulse signal for said duration of the pulse of said first or second timing signal during which said search mode is switched to a normal reproduction mode, said duration of the pulse of said first or second timing signal being greater than or equal to $2T_o$ so that said reproducing element scans over at least one complete section of the n sections in the normal reproduction mode of said reproducing apparatus, where $T_o$ represents the reproducing time of the reproducting element for each address signal recorded in each of the n sections.

2. The address signal reproducing system in claim 1 in which said first or second timing signal has a signal duration of $(2T_o + \alpha)$, where $\alpha$ indicates jitter time and $0 \leq \alpha < T_o$.

* * * * *

UNITED STATES PATENT AND TRADEMARK OFFICE
CERTIFICATE OF CORRECTION

PATENT NO. : 4,550,393

DATED : October 29, 1985

INVENTOR(S) : Hiroyuki Sugiyama, et al.

It is certified that error appears in the above-identified patent and that said Letters Patent is hereby corrected as shown below:

Column 7, Claim 1, line 34, change "elements" to --signals--.

Signed and Sealed this

Fifteenth Day of July 1986

[SEAL]

Attest:

DONALD J. QUIGG

Attesting Officer

Commissioner of Patents and Trademarks